Sept. 1, 1953      R. H. SHIVELY      2,650,681
BRAKE ADJUSTING APPARATUS
Filed Feb. 16, 1950      2 Sheets-Sheet 1
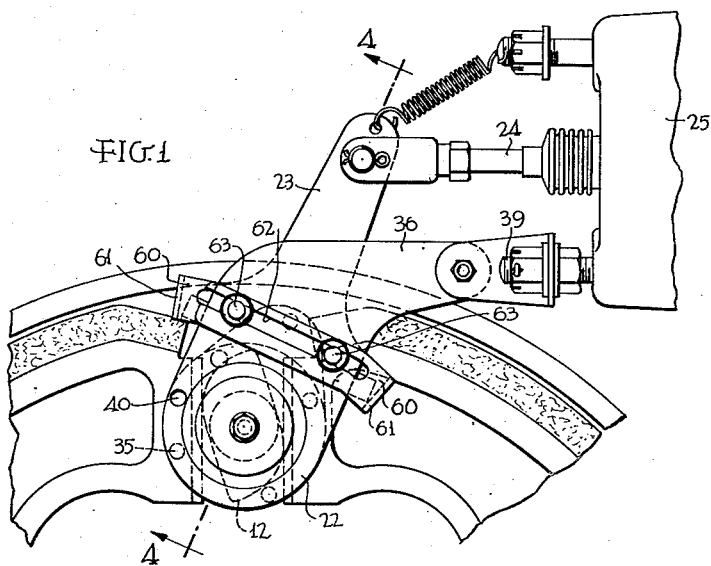
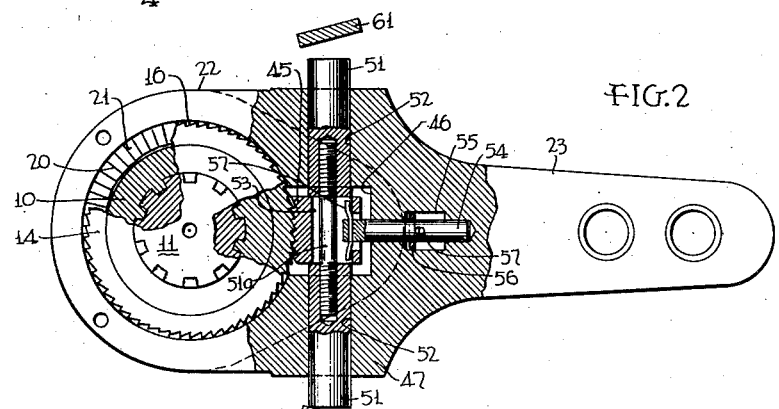
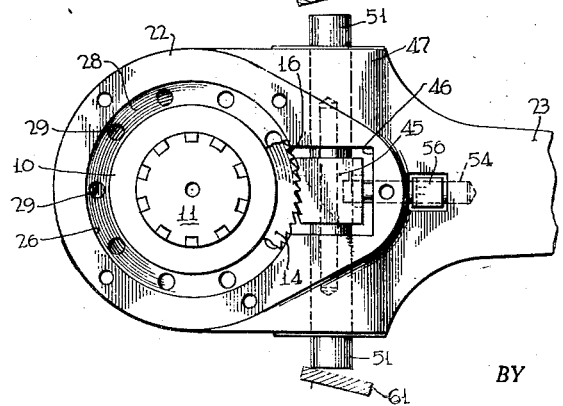
INVENTOR.
Roy H. Shively
BY Roy H. Shively

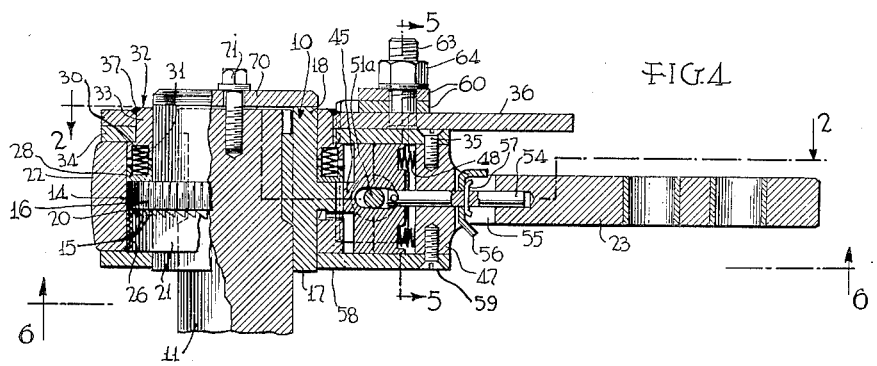
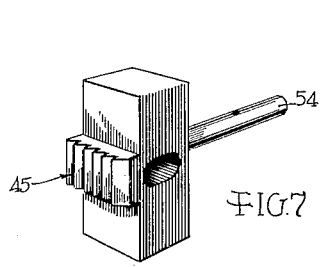
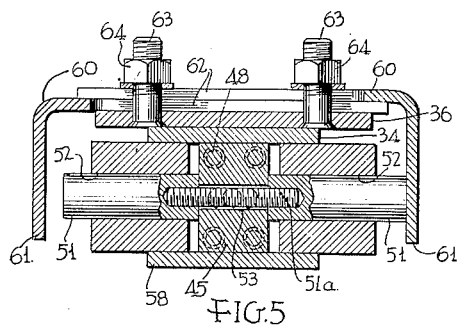
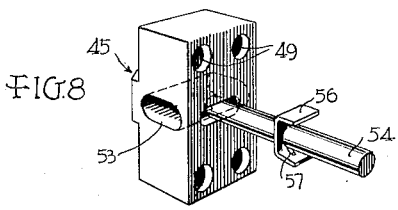
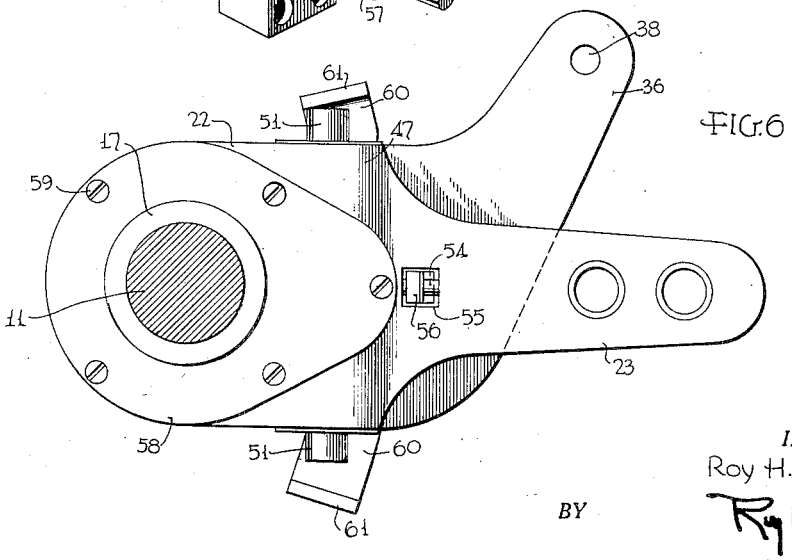

Patented Sept. 1, 1953

2,650,681

UNITED STATES PATENT OFFICE 2,650,681

BRAKE ADJUSTING APPARATUS

Roy H. Shively, Scranton, Pa.

Application February 16, 1950, Serial No. 144,490

9 Claims. (Cl. 188—79.5)

This invention relates to brake adjusting apparatus and has for an object the provision of improvements in this art.

One of the particular objects of the present invention is to provide means for adjusting a single device for operation by power means having different lengths of power strokes.

Another object is to provide stroke adjusting means which is easily accessible and readily adjusted.

Another object is to provide means for quickly and easily re-setting the device to zero, as for example, when the brakes have been re-lined, the same means serving to set the take-up back when it has over-run its take-up position.

Another object is to provide apparatus of compact size and of strong and durable character for substitution in the position normally occupied by the brake actuating arm.

The above and other objects and features of the invention will be apparent from the following description of an exemplary embodiment, reference being made to the accompanying drawings, wherein:

Fig. 1 is an inside elevation of brake operating apparatus including the present invention;

Fig. 2 is a transverse section and elevation through the brake adjusting device of Fig. 1, the view being taken about on the line 2—2 of Fig. 4;

Fig. 3 is an elevation with the cover means at one end removed;

Fig. 4 is an axial section taken on the line 4—4 of Fig. 1;

Fig. 5 is a section taken on the line 5—5 of Fig. 4;

Fig. 6 is an end elevation looking upward from the line 6—6 of Fig. 4;

Fig. 7 is a bottom perspective view of an adjusting pawl removed from the assembly; and Fig. 8 is a top perspective view of the same pawl which is shown in Fig. 7.

The device comprises a ratchet hub 10 splined on the inside surface to fit the splined portion of a brake cam shaft 11 so as to take the place of the hub portion of the usual operator arm which operates the brake cam 12, shown in Fig. 1.

The gear hub intermediate its length is provided with a ratchet gear drum 14, preferably the hub and drum being formed as an integral unit. The drum is provided on one end with an annular set of operating ratchet teeth 15 and on the periphery is provided with an annular set of adjusting ratchet teeth 16. At each side of the ratchet drum the hub provides hub extensions which furnish outer bearing surfaces for operating parts, the hub extension on that end which carries the teeth 15 being designated by the numeral 17 and that on the other end being designated as 18.

On the outer end, that is the end on the side of the teeth 15, a set of operating pawl teeth 20 is provided, the teeth being carried by a ring 21 which fits rotatably on the hub extension 17. The ring 21 is carried rigidly by an open-ended casing 22 which is provided with an operating arm 23 adapted to be connected to an actuating rod 24, as of a power air motor 25. The ring 21 may be formed integrally with the casing but preferably is press-fitted into the bore 26 thereof and may be further secured by screws or by welding. Another convenient mounting scheme, the one illustrated, is to screw the ring into the proper position and there weld it along the outside edges.

On the inner side of the ratchet drum, and rotatable relative to the hub extension 18, there is disposed a presser ring 28, the ring on its outer periphery fitting rotatably within the bore 26 of the casing. On its inner side the presser ring 28 is provided with sockets 29 within which are seated a plurality of coil springs 30, eight being shown.

The other ends of the springs are seated in sockets 31 of a retaining ring 32 which also rotatably fits on the hub extension 18 and within the bore 26 of the casing. The retaining ring 32 has a hub 33 extending out of the casing; and a casing closing plate 34, having relative rotation on the ring hub 33, is removably held on the end of the casing, as by screws 35. To the end of the ring hub 33 there is rigidly secured, as by screwing on, press-fitting, or welding, an anchor arm 36, welding being shown at 37.

At its outer portion the anchor arm 36 is provided with one or more holes 38 by which it may be secured to a fixed part, as by a bolt 39. The inner hub portion of the arm 36 covers the heads of the screws 35, so, to make them accessible for removal, the arm is provided with one or more holes 40 (Fig. 1) which come above the screw heads when the arm is turned, after being disconnected from the anchor bolt 39, of course.

A peripheral adjusting pawl 45 is provided in a recess 46 in the enlarged portion 47 of the casing on the side of its operating arm 23. The recess 46 is wide enough to provide free circumferential movement to the adjusting pawl 45 and is deep enough to provide free radial movement. Springs 48 press the pawl 45 downward to hold its teeth against the peripheral adjusting ratchet teeth 16 of the drum. The springs are retained in sockets in one end of the pawl block 45 and at their other end slide on a flat surface of the casing.

The pawl 45 is provided with one or more pawl actuating elements 51 extending out of the casing, in the present illustration there being one actuating element 51 in the form of a guide rod on each side of the pawl block, the guide rods 51 fitting slidably in aligned holes 52 in the casing. For convenience of assembly the rods 51 are provided with a connecting screw 51a of reduced diameter which extends through an oversized hole 53 in the pawl block, the enlarged ends of the rods 51 being brought up against the sides of the block but still permitting it to move up and down radially.

A lift pin 54 is secured in the block and passes upward through a bore to an opening 55 where it is accessible for being raised to raise the block to free its teeth from the ratchet teeth. The pin may be provided with a head or a lift piece 56 providing for the insertion therebelow of a tool, such as a screwdriver, to lift the pin and pawl. Drive pins 57 hold the pin 56 in the assembly. The hole in block 45 for pin 54 is elongated to permit the block to move relative to the pin.

The ends of the recess 46 for pawl block 45 are closed by an extension of casing closing plate 34 at one end and by an extension of a similar casing closing plate 58 at the other end. The plate 58 fits rotatably on the hub extension 17 and is held on by any suitable means, such as screws 59.

Means are provided for adjusting the elements 51 and through them the adjusting pawl block 45 whenever the brakes become sufficiently worn to require adjustment. The mechanism here shown is itself adjustable to accommodate the brake operating mechanism to different throw lengths. It comprises a pair of bars 60 having bent ears 61 for engaging the ends of push rod elements 51 and slots 62 fitting on studs or bolts 63 carried by anchor plate 36 by which the space between ears may be varied to suit the throw. Nuts 64 lock the bars in position on the bolts 63.

The entire casing may be held on the cam shaft 11 by a cap plate 70 engaging the end of hub 18 and a cap screw 71 holding the plate 70 on the end of the cam shaft.

All teeth are shown to be made with a forward inclination at the tip relative to the root, here about two degrees, to securely hold the teeth locked when pushed together.

In operation, when the brake operating rod 24 is actuated it moves the brake operating arm 23 to turn the casing 22 and with it the operating pawl ring 21. The engagement of teeth 20 of ring 21 with the end teeth 15 of drum 14 causes the drum to turn and thereby to turn the cam shaft 11 on which it is splined to turn the brake cam 12 and apply the brakes. The adjusting pins 51 move with the arm 23 and at each end of the stroke one end of pin 51 will strike the ear 61 of the bars 60 which are fixed in position. When the brakes become worn enough the arm 23 on its brake-applying or outward movement will move far enough to push the pin 51 by a distance great enough to cause the adjusting pawl block 45 to move far enough to carry its teeth backward over the teeth 16 on the periphery of drum 14 by the distance of one tooth, the pawl block 45 rising against its springs 48 to permit this action. Then when the brake arm 23 is next operated it will move the brake cam a greater distance forward to give a stronger brake action.

If for any reason it is desired to set the parts back partially or wholly, this may be done without having to open the casing or remove any parts, simply by placing a suitable tool, such as a screwdriver, under the lift piece 56 and lifting the rod 54 to raise the adjusting pawl teeth from the peripheral teeth 16 of the drum 14. The casing is then pushed axially to disengage the teeth 20 from the teeth 15. The cam shaft will turn backward by its own force or may be turned backward by a wrench or other suitable tool to cause the teeth 15 of drum 14 to turn backward relative to the teeth 20 of ring 21 to permit the brake cam to come to the desired new position.

The above description of operation applies to the installation of the brake adjuster on one particular vehicle, the slotted bars 60 having been adjusted properly at the time the original installation was made to agree with the angle of movement of the operating arm 23. However, for other vehicles or for different power devices which give a different length of movement to the arm operating rod 24, the slotted bars will be readjusted to place the abutment ears 61 further apart or closer together, as may be found necessary.

Although some of the parts are welded together they may readily be taken apart, the welds being of such a nature and being so located that they may readily be burned out without damage to any parts. All tempered parts which might be injured by the heat necessary for making or removing welds are located at a distance from the weld zones. The other parts are of a simple nature and may be quickly assembled and taken apart. The device is very sturdy and dependable and is of small size so it may be installed in place of the usual operating arm which does not provide for brake adjustment.

While one embodiment of the invention has been described to illustrate the principles of the invention it is to be understood that there may be other embodiments within the general scope of the invention.

What is claimed is:

1. Brake adjusting apparatus comprising in combination, a casing turnable about a brake cam shaft, a ratchet gear on said cam shaft, an operating pawl member carried by said casing and cooperating with ratchet teeth on said gear to turn it and apply the brake when the casing is turned, an adjusting pawl carried by said casing and having limited circumferential movement with said ratchet gear, said adjusting pawl having teeth cooperating with teeth on said ratchet gear, striker elements on said adjusting pawl projecting from the casing, and adjustable abutment elements adapted to cooperate with said striker elements, said abutment elements being carried by a fixed part comprising a part of said casing assembly and having a turnable bearing on the casing assembly permitting rotation of the casing assembly relative thereto, the adjustment of said abutment elements providing for brake operating strokes of different length.

2. Brake adjusting apparatus comprising in combination, a casing turnable about a brake cam shaft, a ratchet gear on said cam shaft, operating pawl means between said casing and said ratchet gear for turning the cam shaft to apply the brake, an adjusting ratchet pawl carried by said casing and cooperating with teeth on said ratchet gear, said adjusting pawl being mounted in a recess in said casing to have limited radial movement therein and limited circumferential movement, striker elements extending from said adjusting pawl in guideways in the casing and having striker ends projecting from said casing, and fixed abutment elements cooperating with said striker elements to actuate the adjusting pawl as the casing turns back and forth in the operation of the brake cam shaft.

3. Brake adjusting apparatus as set forth in claim 2, wherein said striker elements are disposed in a radially elongated slot in said adjusting pawl to provide for radial movement of the pawl.

4. Brake adjusting apparatus as set forth in claim 2, wherein said striker elements abut said adjusting pawl at the ends of a radially elongated hole in the pawl and are connected by a smaller diameter rod passing through said hole to provide for radial movement of the adjustment pawl.

5. Brake adjusting apparatus as set forth in claim 2, wherein said striker elements abut the sides of the adjusting pawl and are united by a threaded rod of smaller size passing through an oversized hole in said pawl.

6. Brake adjusting apparatus as set forth in claim 2, wherein said adjusting pawl is provided with a lift element passing out of the pawl recess in a radial guide opening and having transverse sliding movement relative to the pawl.

7. Brake adjusting apparatus as set forth in claim 2, wherein said adjusting pawl is provided with a lift rod passing out of the recess and slidably mounted in a guide, the lift rod having an operating element accessible from the outside of the casing for lifting the pawl.

8. Brake adjusting apparatus as set forth in claim 2, wherein said striker elements are formed as a guide rod engaging the adjusting pawl endwise and having radial movement relative thereto, and a guided lift rod connected with said pawl but having transverse movement relative thereto.

9. Brake adjusting apparatus comprising in combination with a brake cam shaft, a self-contained unit assembly including a casing having an arm actuated by the brake-actuating rod, a gear drum in said casing mounted on splines on said cam shaft, said drum having hubs about which said casing turns, end and peripheral ratchet teeth on said drum, an operating ratchet ring fixed in said casing and having teeth mating with the end teeth on said drum, an end retaining plate secured to the casing over said ring, a presser ring located on the other side of said drum, a backing ring in said casing behind said presser ring, springs between said backing ring and presser ring, an end plate retaining said backing ring in said casing, anchor means for holding said backing ring in fixed position, said backing ring having relative rotation with respect to said drum hub and said casing, said casing having axial movement on said drum hubs to allow the end ratchet teeth of the drum and operating ratchet ring to pass over each other, said casing having a recess above the peripheral teeth of the drum, an adjusting pawl block mounted in said recess for radial sliding movement and trans-radial sliding movement, said casing end plates having extensions covering the open ends of said pawl recess, striker rods slidably operating in guides at the sides of said pawl block and abutting the sides of the pawl block, the pawl block having a radially elongated slot about said guide rods to provide for radial movement of the pawl, a radial guide and lift rod connected with the pawl block and providing trans-radial movement relative thereto, and abutment bars for said striker rods adjustably secured to said anchor means.

ROY H. SHIVELY.

References Cited in the file of this patent

UNITED STATES PATENTS

| Number | Name | Date |
|---|---|---|
| 1,525,568 | Chapin | Feb. 10, 1925 |
| 2,379,796 | Freeman et al. | July 3, 1945 |
| 2,522,903 | Shively | Sept. 19, 1950 |